(12) United States Patent
Takeuchi et al.

(10) Patent No.: US 10,378,375 B2
(45) Date of Patent: Aug. 13, 2019

(54) POWER GENERATION PLANNING SUPPORT APPARATUS AND POWER GENERATION PLANNING SUPPORT METHOD

(71) Applicant: Kabushiki Kaisha Toshiba, Minato-ku (JP)

(72) Inventors: Tsukasa Takeuchi, Yokohama (JP); Makoto Takahashi, Yokohama (JP); Yoji Kubo, Fuchu (JP); Masaki Katsumata, Fuchu (JP); Toyohiro Akebi, Inagi (JP); Masaru Dejima, Yokohama (JP); Keiko Shimizu, Kawasaki (JP); Dai Murayama, Musashino (JP); Shingo Tamaru, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 183 days.

(21) Appl. No.: 15/041,449

(22) Filed: Feb. 11, 2016

(65) Prior Publication Data

US 2016/0247074 A1 Aug. 25, 2016

(30) Foreign Application Priority Data

Feb. 24, 2015 (JP) .................................. 2015-033887

(51) Int. Cl.
*F01D 19/02* (2006.01)
*F01K 5/00* (2006.01)

(52) U.S. Cl.
CPC .............. *F01D 19/02* (2013.01); *F01K 5/00* (2013.01); *F05D 2220/31* (2013.01);
(Continued)

(58) Field of Classification Search
None
See application file for complete search history.

(56) References Cited

U.S. PATENT DOCUMENTS 7,206,644 B2 4/2007 Iino et al.
8,195,339 B2 6/2012 Long et al.
(Continued)

FOREIGN PATENT DOCUMENTS

JP H10-77805 A 3/1998
JP 2005-284388 A 10/2005
(Continued)

OTHER PUBLICATIONS

Office Action dated Feb. 9, 2017 in Australian Patent Application No. 2016201000.

*Primary Examiner* — James G Norman
(74) *Attorney, Agent, or Firm* — Oblon, McClelland, Maier & Neustadt, L.L.P.

(57) ABSTRACT

In one embodiment, a power generation planning support apparatus includes an acquiring module configured to acquire a physical quantity that represents a startup condition of a turbine. The apparatus further includes a first storage module configured to store first information that represents a relationship between a startup schedule of the turbine and the physical quantity. The apparatus further includes a predicting module configured to predict the startup schedule of the turbine, based on the physical quantity acquired by the acquiring module and the first information stored in the first storage module. The apparatus further includes an outputting module configured to output the startup schedule predicted by the predicting module.

10 Claims, 6 Drawing Sheets

(52) U.S. Cl.
 CPC ...... *F05D 2220/32* (2013.01); *F05D 2260/85* (2013.01); *F05D 2270/71* (2013.01); *Y02E 20/16* (2013.01)

(56) References Cited

U.S. PATENT DOCUMENTS

| | | | | |
|---|---|---|---|---|
| 2007/0234734 A1* | 10/2007 | Uluyol | ...................... | F02C 7/26 60/778 |
| 2013/0073101 A1* | 3/2013 | O'Connor | .............. | G06Q 10/00 700/291 |
| 2015/0185716 A1* | 7/2015 | Wichmann | ............ | F01K 23/101 700/287 |

FOREIGN PATENT DOCUMENTS

| | | |
|---|---|---|
| JP | 2006-257925 | 9/2006 |
| JP | 2011-111959 | 6/2011 |
| JP | 2014-181570 | 9/2014 |

\* cited by examiner

POWER GENERATION PLANNING SUPPORT APPARATUS AND POWER GENERATION PLANNING SUPPORT METHOD

CROSS REFERENCE TO RELATED APPLICATION

This application is based upon and claims the benefit of priority from the prior Japanese Patent Application No. 2015-33887, filed on Feb. 24, 2015, the entire contents of which are incorporated herein by reference.

FIELD

Embodiments described herein relate to a power generation planning support apparatus and a power generation planning support method.

BACKGROUND

In recent years, steam turbines have been often started up by a method called optimal startup. In the optimal startup, a steam turbine is started up by successively predicting a steam temperature, a steam pressure, a heat transfer coefficient and the like of the steam turbine and controlling startup operation such that the rate of speed increase or the rate of load increase in the steam turbine reaches a maximum within a range in which a thermal stress of a turbine rotor does not become excessively high.

In addition, studies have been conducted on a method of predicting the time taken for the startup of the steam turbine in the application of the optimal startup (startup time). However, it is difficult to predict the startup time in the application of the optimal startup with high accuracy, and applying the prediction result of the startup time to an actual steam turbine (an actual machine) presents challenges. For an operating party of a power plant, the prediction of the startup time with high accuracy has an advantage of accurately responding a power demand request, and an advantage of reducing the operational cost of the power plant. For this reason, there are great demands of the operating party for the prediction of the startup time.

DETAILED DESCRIPTION

Embodiments will now be explained with reference to the accompanying drawings.

When the startup time is predicted in the application of the optimal startup, state values such as temperature, pressure and thermal stress of a main part of the steam turbine are predicted, an optimal rate of speed increase and an optimal rate of load increase are predicted from the state values, and the startup time is predicted from the rate of speed increase and the rate of load increase, for example. However, when a comparison is made between the predicted startup time and the startup time of an actual machine, the steam temperature or the steam pressure of the actual machine may not change as predicted, causing an error between the predicted startup time and the startup time of the actual machine. A similar problem may occur in a turbine other than a steam turbine (e.g., a gas turbine).

In one embodiment, a power generation planning support apparatus includes an acquiring module configured to acquire a physical quantity that represents a startup condition of a turbine. The apparatus further includes a first storage module configured to store first information that represents a relationship between a startup schedule of the turbine and the physical quantity. The apparatus further includes a predicting module configured to predict the startup schedule of the turbine, based on the physical quantity acquired by the acquiring module and the first information stored in the first storage module. The apparatus further includes an outputting module configured to output the startup schedule predicted by the predicting module.

Figure 1:
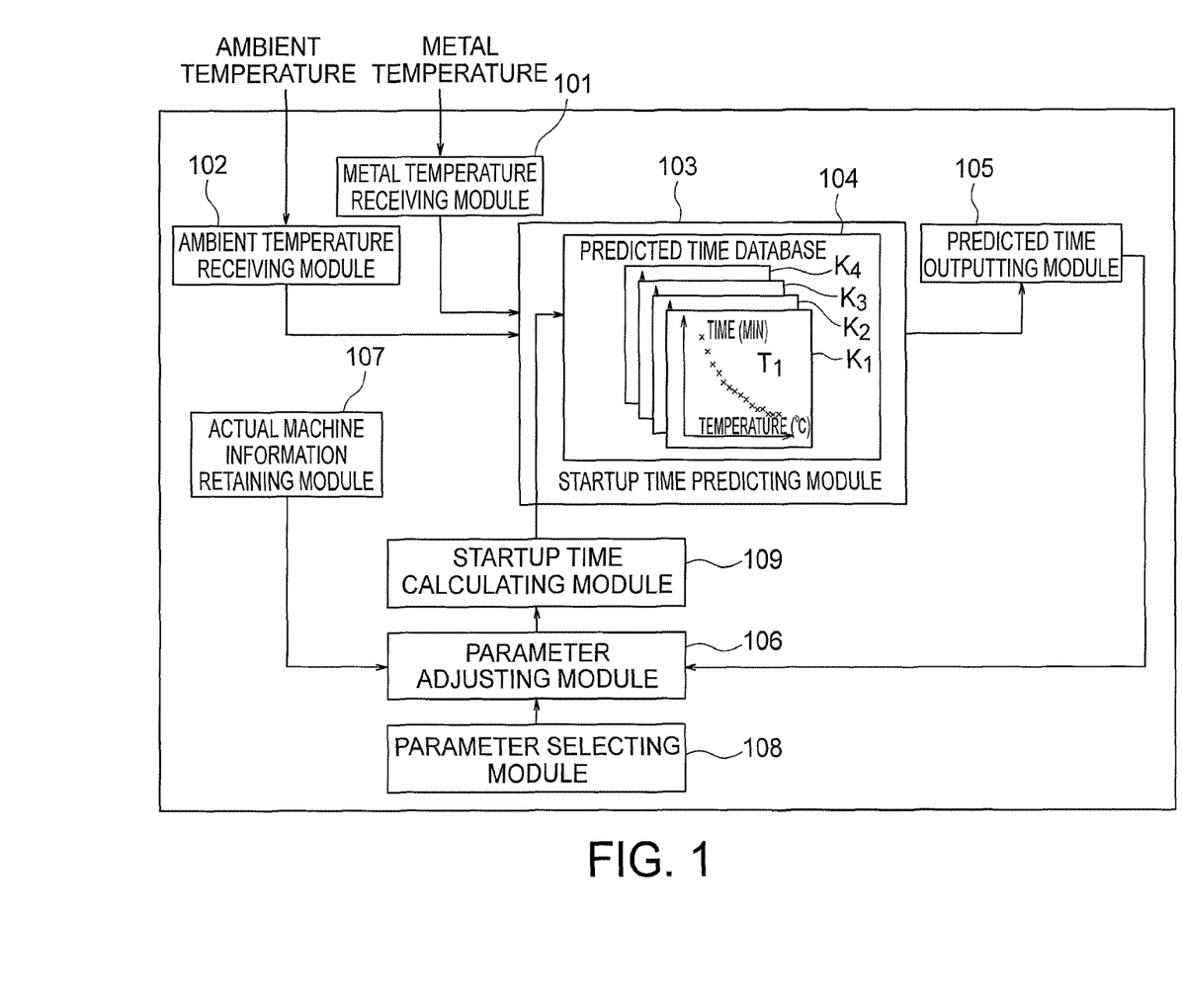
FIG. 1 is a schematic diagram illustrating a configuration of a power generation planning support apparatus in a first embodiment.

First Embodiment (1) Configuration of Power Generation Planning Support Apparatus in First Embodiment FIG. 1 is a schematic diagram illustrating a configuration of a power generation planning support apparatus in a first embodiment. Examples of the power generation planning support apparatus illustrated in FIG. 1 include a personal computer and a workstation.

The power generation planning support apparatus illustrated in FIG. 1 includes a metal temperature receiving module 101, an ambient temperature receiving module 102, a startup time predicting module 103, a predicted time database 104, and a predicted time outputting module 105. The metal temperature receiving module 101 and the ambient temperature receiving module 102 are an example of an acquiring module. The startup time predicting module 103 is an example of a predicting module. The predicted time database 104 is an example of a first storage module. The predicted time outputting module 105 is an example of an outputting module.

The power generation planning support apparatus illustrated in FIG. 1 further includes a parameter adjusting module 106, an actual machine information retaining module 107, a parameter selecting module 108, and a startup time calculating module 109. The parameter adjusting module 106, the actual machine information retaining module 107, the parameter selecting module 108, and the startup time calculating module 109 are an example of a deriving module. The parameter adjusting module 106 is an example of an adjusting module. The actual machine information retaining module 107 is an example of a retaining module.

The components 101 to 109 will be described below in detail in turn.

(1.1) Components 101 and 102

The metal temperature receiving module 101 and the ambient temperature receiving module 102 receive temperature that is physical quantity representing a startup condition for a turbine, and input received temperature to the startup time predicting module 103. Specifically, the metal temperature receiving module 101 receives the metal temperature of a turbine rotor that is coupled to a turbine, and the ambient temperature receiving module 102 receives the ambient temperature of the turbine. The turbine rotor is an example of a predetermined portion of the turbine.

Examples of the turbine include a steam turbine and a gas turbine. The power generation planning support apparatus in the present embodiment may input only the metal temperature to the startup time predicting module 103, or may input both the metal temperature and the ambient temperature to the startup time predicting module 103. For example, in the case where the application target of the present embodiment is a combined-cycle power plant provided with a gas turbine, the power generation planning support apparatus in the present embodiment inputs the metal temperature and the ambient temperature into the startup time predicting module 103.

Figure 2:
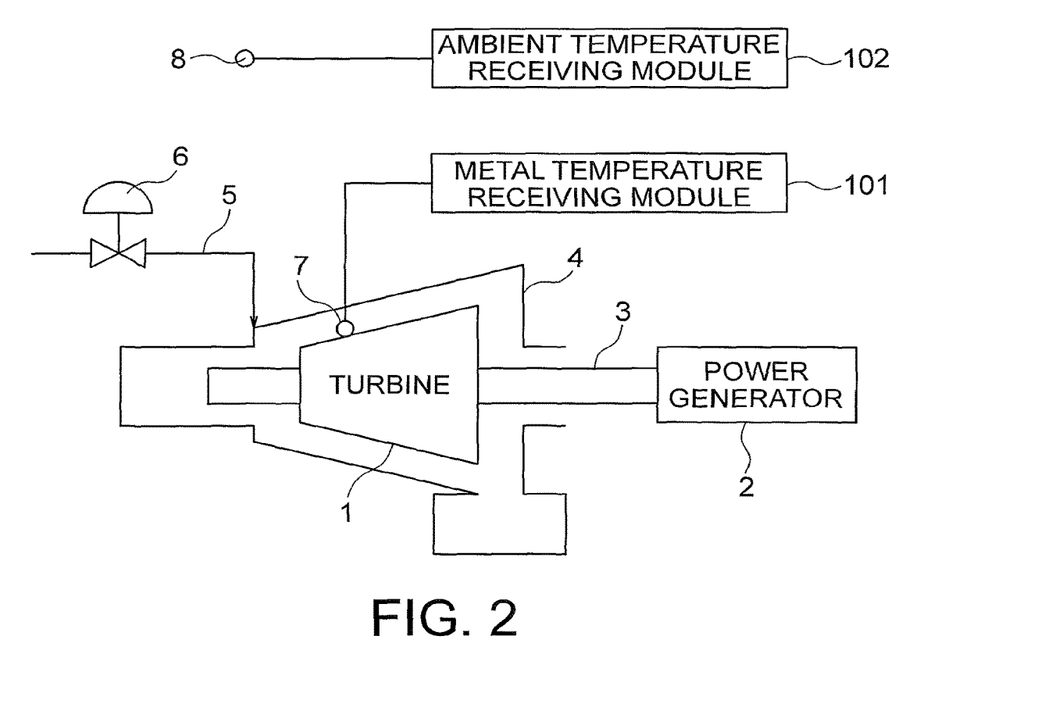
FIG. 2 is a schematic diagram illustrating an example of a power plant in the first embodiment.

FIG. 2 is a schematic diagram illustrating an example of a power plant in the first embodiment.

The power plant illustrated in FIG. 2 includes a turbine 1, a power generator 2, a turbine rotor 3 that is coupled to the turbine 1 and the power generator 2, and a turbine casing 4 that houses the turbine 1. The power plant illustrated in FIG. 2 further includes a working fluid pipe 5 that feeds working fluid to the turbine 1, a control valve 6 that is provided in the working fluid pipe 5, a metal temperature sensor 7 that measures the metal temperature of the turbine rotor 3, and an ambient temperature sensor 8 that measures the ambient temperature of the turbine 1. Examples of the working fluid include vapor and gas.

The metal temperature sensor 7 transmits a measured metal temperature to the metal temperature receiving module 101. This allows the metal temperature receiving module 101 to acquire the metal temperature. The ambient temperature sensor 8 transmits the ambient temperature of the turbine 1 to the ambient temperature receiving module 102. This allows the ambient temperature receiving module 102 to acquire the ambient temperature.

Figure 3:
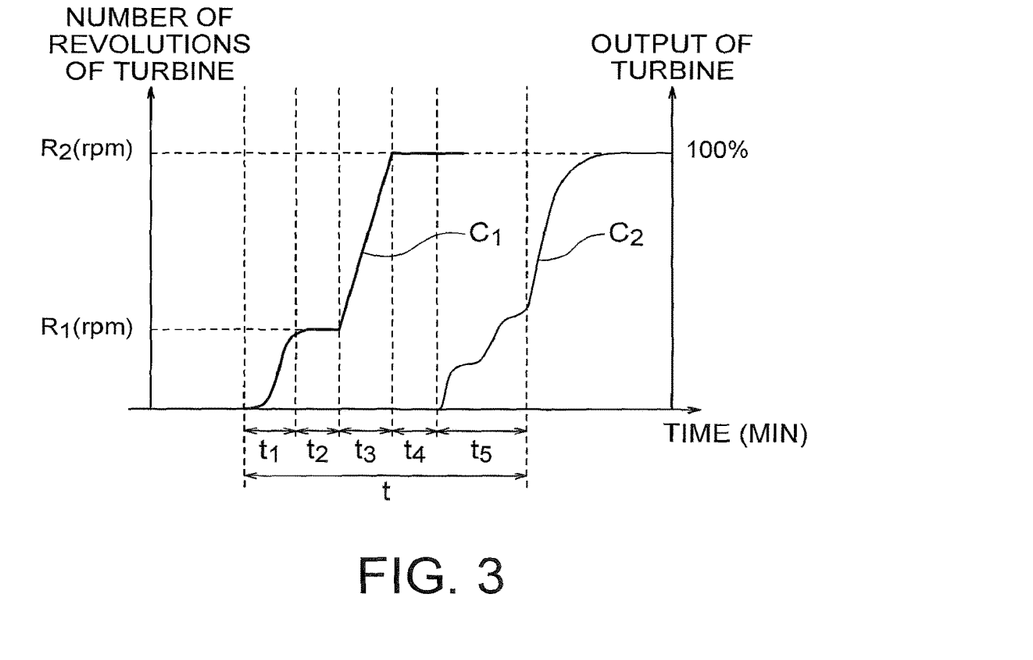
FIG. 3 is a graph for illustrating an example of a method of starting up a turbine in the first embodiment.

FIG. 3 is a graph for illustrating an example of a method of starting up the turbine 1 in the first embodiment.

FIG. 3 illustrates time "$t_1$" to "$t_5$" taken in respective events from the initiation of starting up the turbine 1 until the turbine 1 reaches a power generating state (event time). A curve $C_1$ represents a number of revolutions of the turbine 1. A curve $C_2$ represents the output of the turbine 1.

The time "$t_1$" represents the time from the initiation of startup of the turbine 1 until low-speed heat soak. The time "$t_2$" represents the time taken for the low-speed heat soak. The time "$t_3$" represents the time from the completion of the low-speed heat soak on the turbine 1 until high-speed heat soak. The time "$t_4$" represents the time taken for the high-speed heat soak. The time "$t_5$" represents the time from the completion of the high-speed heat soak on the turbine 1 until the output of the turbine 1 reaches a predetermined output. The lengths of the time "$t_1$" to "$t_5$" vary depending on the startup condition of the turbine 1. A reference character "$R_1$" denotes a number of revolutions in the low-speed heat soak, and reference character "$R_2$" denotes a number of revolutions in the high-speed heat soak.

The time "t" (="$t_1$"+"$t_2$"+"$t_3$"+"$t_4$"+"$t_5$") represents the time taken for the startup of the turbine 1 (startup time). When the turbine 1 is started up by an optimal startup, the startup time "t" can be shortened as compared to a normal startup method.

Referring back to FIG. 1, the description of the power generation planning support apparatus will be continued.

(1.2) Components 103 to 105

The startup time predicting module 103 predicts a startup schedule of the turbine based on a metal temperature acquired by the metal temperature receiving module 101, an ambient temperature acquired by the ambient temperature receiving module 102, and information stored in the predicted time database 104. The startup schedule of the turbine in the present embodiment can be expressed using the above-mentioned event time "$t_1$" to "$t_5$" or the startup time "t". The startup time predicting module 103 in the present embodiment therefore predicts the event time "$t_1$" to "$t_5$" or the startup time "t" as the startup schedule of the turbine.

Specifically, the startup time predicting module 103 in the present embodiment performs the following processing by means of the predicted time database 104.

In the predicted time database 104, information is stored that represents the relationship between the metal temperature of the turbine and ambient temperature, and the startup schedule of the turbine (hereafter, referred to as first information). Reference characters $K_1$ to $K_4$ denote graphs that are equivalent of an example of the first information.

The graphs $K_1$ to $K_4$ represent the relationships between the metal temperature and the time "$t_1$" at ambient temperatures of "$T_1$" to "$T_4$". In the predicted time database 104, graphs are stored that represent the relationship between the metal temperature and the time "$t_1$" at various ambient temperatures. Similarly, in the predicted time database 104, graphs are stored that represent the relationships between the metal temperature and the time "$t_2$", "$t_3$", "$t_4$" and "$t_5$" at various ambient temperatures. Furthermore, in the predicted time database 104, graphs are stored that represent the relationship between the metal temperature and the startup time "t" at various ambient temperatures. The predicted time database 104 in the present embodiment retains the graphs in the form of tables.

The predicted time database 104 in the present embodiment, the time "$t_1$" to "$t_5$" at the time when the turbine is started up by an optimal startup is stored. The time "$t_1$" to "$t_5$" is calculated by the startup time calculating module 109. Specifically, the startup time calculating module 109 predicts a thermal stress occurring in the turbine rotor during the startup of the turbine and predicts an increasing process of the number of revolutions and the load of the turbine that makes the startup time "t" shortest while the thermal stress is kept to a specified value or lower, so as to calculate the time "$t_1$" to "$t_5$". The startup time calculating module 109 stores the calculation result of the time "$t_1$" to "$t_5$" in the predicted time database 104, in the form of the graphs $K_1$ to $K_4$. Therefore, in the present embodiment, using the predicted time database 104 allows for the prediction of the event time "$t_1$" to "$t_5$" and the startup time "t" in the application of the optimal startup.

When acquiring a metal temperature and an ambient temperature, the startup time predicting module 103 searches the predicted time database 104 for the time "$t_1$" to "$t_5$" that conforms to the acquired temperatures. If no time "$t_1$" to "$t_5$" matching the acquired temperatures is searched for in the first information in the predicted time database 104, the startup time predicting module 103 calculates the time "$t_1$" to "$t_5$" that best conform to the acquired temperatures based on the first information in the predicted time database 104. The time "$t_1$" to "$t_5$" obtained in such a manner is the predicted values of the event time in the application of optimal startup (predicted event time). The predicted event time is output to the predicted time outputting module 105.

The startup time predicting module 103 further calculates the value of the time "t". The time "t" obtained in such a manner is the predicted value of the startup time (predicted startup time) in the application of the optimal startup. The predicted startup time is output to the predicted time outputting module 105.

The predicted time outputting module 105 outputs the obtained predicted event time "$t_1$" to "$t_5$" and predicted startup time "t". The predicted event time "$t_1$" to "$t_5$" and the predicted startup time "t" are output in the form of, for example, displaying on a display device of the power generation planning support apparatus, data transmission to the outside of the power generation planning support apparatus, storing in an internal storage of the power generation planning support apparatus, and the like. The predicted time outputting module 105 in the present embodiment outputs the predicted event time "$t_1$" to "$t_5$" and the predicted startup time "t" to the parameter adjusting module 106.

The startup time predicting module 103 may predict the startup schedule based on a metal temperature, an ambient temperature, and the first information, or may predict the startup schedule based on a metal temperature and the first information, without an ambient temperature.

(1.3) Components 106 to 109

The actual machine information retaining module 107 retains actual machine information such as metal temperature, ambient temperature, startup time, and event time, which are measured when the turbine is actually started up by the optimal startup. The startup time and the event time contained in the actual machine information are an example of an actual machine startup schedule. For example, the actual machine information retaining module 107 acquires a metal temperature from the metal temperature receiving module 101 and acquires an ambient temperature from the ambient temperature receiving module 102. The actual machine information retaining module 107 outputs such actual machine information to the parameter adjusting module 106.

The parameter adjusting module 106, the parameter selecting module 108, and the startup time calculating module 109 derive new first information that represents the relationships between metal temperature and ambient temperature, and the event time "$t_1$" to "$t_5$", based on the startup schedule acquired from the predicted time outputting module 105 and the actual machine information acquired from the actual machine information retaining module 107. The startup time calculating module 109 then stores the new first information in the predicted time database 104. In such a manner, the first information in the predicted time database 104 is updated. As a result, for example, the forms of the graphs $K_1$ to $K_4$ change.

Specifically, the parameter adjusting module 106, the parameter selecting module 108, and the startup time calculating module 109 in the present embodiment perform the following processing.

The parameter adjusting module 106 retains an expression to calculate event time "$t_1$" to "$t_5$" in the application of the optimal startup. The expression has various parameters. When acquiring the predicted startup time "t" and the predicted event time "$t_1$" to "$t_5$" from the predicted time outputting module 105, the parameter adjusting module 106 calculates, in addition to the predicted startup time "t" and the predicted event time "$t_1$" to "$t_5$", the startup time "t" and the event time "$t_1$" to "$t_5$", using the expression. Hereafter, the startup time "t" and the event time "$t_1$" to "$t_5$" calculated using the expression will be referred to as the calculated startup time "t" and the calculated event time "$t_1$" to "$t_5$", respectively.

In the calculation, the parameter adjusting module 106 adjusts the values of the parameters in the expression such that error between the calculated event time "$t_1$" to "$t_5$" and the event time of an actual machine becomes smaller than error between the predicted event time "$t_1$" to "$t_5$" and the event time of the actual machine. Specifically, the parameter adjusting module 106 repeats the adjustment of the value of the parameters until the difference between each of the calculated event time "$t_1$" to "$t_5$" and each of the event time of the actual machine becomes specified time or shorter, and the difference between the calculated startup time "t" and the startup time of the actual machine becomes the specified time. As seen above, the parameter adjusting module 106 can adjust the values of the parameters so as to obtain the calculated event time "$t_1$" to "$t_5$" the error of which are smaller than that of the predicted event time "$t_1$" to "$t_5$". A specific example of the processing performed by the parameter adjusting module 106 will be described later with reference to FIG. 4.

The expression used by the parameter adjusting module 106 contains parameters that have an influence on the event time "$t_1$" to "$t_5$" in the application of the optimal startup, and parameters that have no influence on the event time "$t_1$" to "$t_5$" in the application of the optimal startup. The parameter selecting module 108 retains information on all the parameters of the expression. The parameter selecting module 108 automatically selects, from among all these parameters, some parameter having an influence on the event time "$t_1$" to "$t_5$" and provides information on the selected parameters to the parameter adjusting module 106. Examples of such parameters include parameters that have an influence on the rate of speed increase or the rate of load increase of the turbine, for example, a maximum rate of speed increase or a maximum rate of load increase. The parameter selecting module 108 automatically selects, for example, parameters that have a great influence on the rate of speed increase or the rate of load increase of the turbine.

The parameter adjusting module 106 adjusts the values of the parameters selected by the parameter selecting module 108 such that the error of calculated event time "$t_1$" to "$t_5$" becomes smaller than the error of the predicted event time "$t_1$" to "$t_5$". The parameter adjusting module 106 then inputs the adjustment result of the parameters into the startup time calculating module 109.

Therefore, the startup time calculating module 109 acquires the values of the parameters adjusted based on the predicted startup time "t" and the predicted event time "$t_1$" to "$t_5$". The startup time calculating module 109 then calculates the event time "$t_1$" to "$t_5$" using the value of the parameters and the above expression to derive new first information indicating the relationship between metal temperature and ambient temperature, and the event time "$t_1$" to "$t_5$". Furthermore, the startup time calculating module 109 stores the derived new first information in the predicted time database 104. The new first information may further contain information that indicates the relationship metal temperature and ambient temperature, and the startup time "t".

(2) Action of Power Generation Planning Support Apparatus in First Embodiment

With continuous reference to FIG. 1, the action of the power generation planning support apparatus in the present embodiment will be described.

The predicted time database 104 retains the first information that is derived in advance by the startup time calculating module 109. When the actual machine information retaining module 107 retains no actual machine information, the startup time calculating module 109 derives first information using assumed values of the parameters and stores the first information in the predicted time database 104. In contrast, when the actual machine information retaining module 107 retains actual machine information, the startup time calculating module 109 derives first information using the values of the parameters that the parameter adjusting module 106 adjusts based on the actual machine information, and stores the first information in the predicted time database 104.

The startup time predicting module 103 searches the predicted time database 104 for the time "$t_1$" to "$t_5$" that conform to acquired metal temperature. If there is no time "$t_1$" to "$t_5$" conforming to the metal temperature in the first information predicted time database 104, the startup time predicting module 103 calculates the time "$t_1$" to "$t_5$" that best conform to the metal temperature based on the first information in the predicted time database 104.

For example, in the case where a metal temperature acquired by the startup time predicting module 103 is 150° C., the startup time predicting module 103 searches the predicted time database 104 for the time "$t_1$" to "$t_5$" at a metal temperature of 150° C. In this case, if the search returns the time "$t_1$" at a metal temperature of 150° C., the returned time "$t_1$" is output to the predicted time outputting module 105. In contrast, if the search does not return the time "$t_1$" at a metal temperature of 150° C., the time "$t_1$" at a temperature on a high-temperature side closest to 150° C., and the time "$t_1$" at a temperature on a low-temperature side closest to 150° C. are selected. The startup time predicting module 103 then calculates the time "$t_1$" at 150° C. using a first-order approximate expression by interpolating the metal temperatures. In this case, the calculated time "$t_1$" is output to the predicted time outputting module 105. This is true for the time "$t_2$" to "$t_5$".

In the case where the turbine has been started up by the optimal startup one or more times, the parameter adjusting module 106 adjusts the values of the parameter using an algorithm to be described later illustrated in FIG. 4. The parameter selecting module 108 selects a parameter having an influence on the time "$t_1$", a parameter having an influence on the time "$t_2$", a parameter having an influence on the time "$t_3$", a parameter having an influence on the time "$t_4$", and a parameter having an influence on the time "$t_5$" individually. For example, when the maximum rate of speed increase is increased or decreased, the parameter selecting module 108 checks for which time of the time "$t_1$" to "$t_5$" the increase or decrease has an influence on. Then, when the increase or decrease has an influence on the time "$t_1$", the maximum rate of speed increase is selected as a parameter having an influence on the time "$t_1$".

Figure 4:
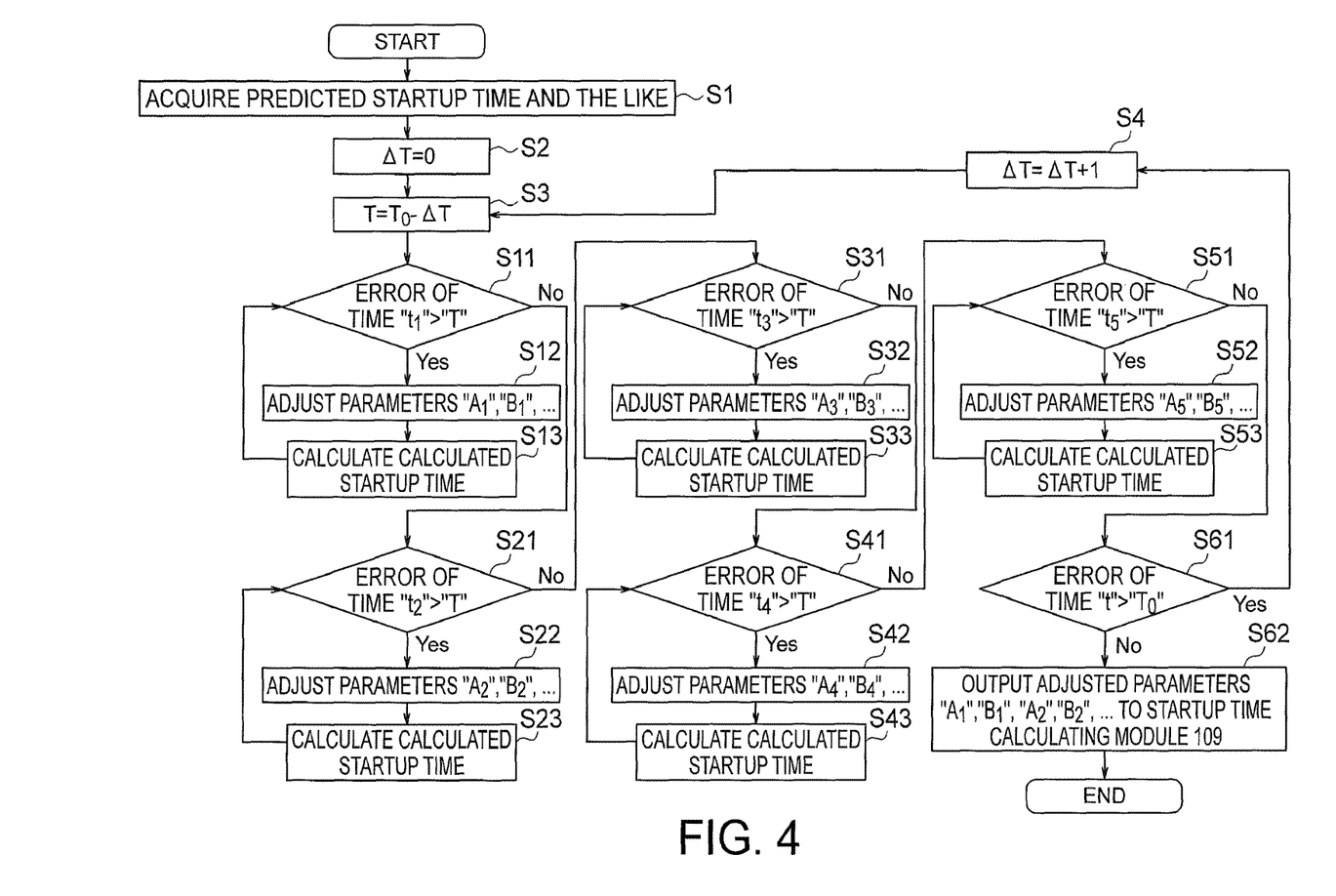
FIG. 4 is a flow chart illustrating a power generation planning support method in the first embodiment.

FIG. 4 is a flow chart illustrating a power generation planning support method in the first embodiment. FIG. 4 illustrates a specific example of processing performed by the parameter adjusting module 106.

The parameter adjusting module 106 first acquires the predicted startup time "t" and the predicted event time "$t_1$" to "$t_5$" from the predicted time outputting module 105 (step S1). Reference characters "T" and "$T_0$" illustrated in step S3 in FIG. 4 denote, respectively, a threshold value for the error of the event time "$t_1$" to "$t_5$", and a threshold value for the startup time "t". In addition, reference character "ΔT" illustrated in step S3 in FIG. 4 denotes a decrement in the threshold value "T". The threshold value "T" in the present embodiment is given by "T"="$T_0$"−"ΔT".

Subsequent to step S1, the parameter adjusting module 106 sets the decrement "ΔT" in the threshold value "T" at zero, which makes the value of the threshold value "T" the same as the value of the threshold value "$T_0$" (steps S2 and S3). The threshold value "$T_0$" is, for example, 5 minutes. As will be described, the decrement "ΔT" is increased to 1 minute, 2 minutes, 3 minutes, . . . , and the threshold value "T" will be decreased to 5 minutes, 4 minutes, 3 minutes, . . . (see step S4).

Next, the parameter adjusting module 106 judges whether the error between the predicted event time "$t_1$" and the event time "$t_1$" of the actual machine is larger than the threshold value "T" (step S11). If the error is the threshold value "T" or smaller, the processing proceeds to step S21. If the error is larger than the threshold value "T", the parameter adjusting module 106 adjusts the values of one or more parameters "$A_1$", "$B_1$", . . . (step S12) and calculates the calculated event time "$t_1$" using the adjusted values of the parameters "$A_1$", "$B_1$", . . . (step S13). Next, the parameter adjusting module 106 judges whether the error between the calculated event time "$t_1$" and the event time "$t_1$" of the actual machine is larger than the threshold value "T" (step S11). The parameter adjusting module 106 repeats the processes of steps S11 to S13 until the error becomes the threshold value "T" or smaller.

Next, the parameter adjusting module 106 performs the same processes as those of steps S11 to S13 on the predicted event time "$t_2$" and the calculated event time "$t_2$" (steps S21 to S23). The processes of steps S21 to S23 are repeated until the error between the predicted (or calculated) event time "$t_2$" and the event time "$t_2$" of the actual machine becomes the threshold value "T" or smaller. In step S22, the parameter adjusting module 106 adjusts the values of parameters "$A_2$", "$B_2$", . . . , which are not adjusted in step S12. This is because if adjusting again the parameters adjusted in step S12 involves the risk that the error of the calculated event time "$t_1$" becomes the threshold value "T" or larger again.

Next, the parameter adjusting module 106 performs the same processes as those of steps S11 to S13 on the predicted event time "$t_3$" and the calculated event time "$t_3$" (steps S31 to S33). In step S32, the parameter adjusting module 106 adjusts the values of parameters "$A_3$", "$B_3$", . . . , which are not adjusted in steps S12 and S22.

Next, the parameter adjusting module 106 performs the same processes as those of steps S11 to S13 on the predicted event time "$t_4$" and the calculated event time "$t_4$" (steps S41 to S43). In step S42, the parameter adjusting module 106 adjusts the values of parameters "$A_4$", "$B_4$", . . . , which are not adjusted in steps S12, S22, and S32.

Next, the parameter adjusting module 106 performs the same processes as those of steps S11 to S13 on the predicted event time "$t_5$" and the calculated event time "$t_5$" (steps S51 to S53). In step S52, the parameter adjusting module 106 adjusts the values of parameter "$A_5$", "$B_5$", . . . , which are not adjusted in steps S12, S22, S32, and S42.

The parameter adjusting module 106 in the present embodiment performs the calculation of the calculated event time in the order of "$t_1$", "$t_2$", "$t_3$", "$t_4$", and "$t_5$". This is because changes in thermal stress in each event depend on the thermal stress in the previous event.

Next, the parameter adjusting module 106 calculates the calculated startup time "t" using the calculated event time "$t_1$" to "$t_5$" calculated steps S11 to S53 and judges whether the error between the calculated startup time "t" and the startup time "t" of the actual machine is larger than the threshold value "$T_0$" (step S61). If the error is the threshold value "$T_0$" or smaller, the processing proceeds to step S62. If the error is larger than the threshold value "$T_0$", the parameter adjusting module 106 decreases the threshold value "T" by 1 minute (steps S3 and S4) and repeats the processes of steps S11 to S61. The reason of decreasing the threshold value "T" is to decrease the error of the calculated startup time "t" by decreasing the threshold value "T" so as to decrease the error of the calculated event time "$t_1$" to "$t_5$".

When the error of the calculated startup time "t" becomes the threshold value "$T_0$" or smaller, the parameter adjusting module 106 outputs the values of parameters "$A_1$" to "$A_5$", "$B_1$" to "$B_5$", . . . , adjusted in step S11 to S53 to the startup time calculating module 109 (step S62). In such a manner, the startup time calculating module 109 can acquire the values of parameters adjusted by the parameter adjusting module 106.

(3) Effects of Power Generation Planning Support Apparatus in First Embodiment

As described above, the power generation planning support apparatus in the present embodiment stores in the predicted time database 104 the first information that represents the relationship between physical quantities such as metal temperature and ambient temperature, and startup schedules such as the event time "$t_1$" to "$t_5$" and the startup time "t". The startup time predicting module 103 in the present embodiment then predicts the startup schedule of the turbine based on the metal temperature acquired by the metal temperature receiving module 101, the ambient temperature acquired by the ambient temperature receiving module 102, and the first information stored in the predicted time database 104.

Therefore, according to the present embodiment, it is possible, in order to predict the startup schedule of the turbine, to easily predict the startup schedule using the predicted time database 104 without performing complex calculation every prediction. To theoretically predict the startup schedule of the turbine, it is necessary complex calculation every prediction, but according to the present embodiment, it is possible to avoid such complex calculation. In addition, according to the present embodiment, by enhancing the accuracy of the first information in the predicted time database 104, it is possible to improvement the prediction accuracy of the startup time "t" and the event time "$t_1$" to "$t_5$" of the turbine.

In addition, the power generation planning support apparatus in the present embodiment derives new first information based on the predicted startup time "t" and the predicted event time "$t_1$" to "$t_5$" output from the predicted time outputting module 105 and stores the derived new first information in the predicted time database 104. At this point, the predicted startup time "t" and the predicted event time "$t_1$" to "$t_5$" output from the predicted time outputting module 105 reflect the metal temperature and the ambient temperature that are acquired in startup by the metal temperature receiving module 101 and the ambient temperature receiving module 102. Therefore, according to the present embodiment, it is possible to enhance the accuracy of the first information in the predicted time database 104 with increase in the number of startups of the turbine. As a result, it is possible to enhance the prediction accuracy of the startup time "t" and the event time "$t_1$" to "$t_5$" of the turbine. In addition, according to the present embodiment, it is also possible to enhance the prediction accuracy of the startup time "t" and the event time "$t_1$" to "$t_5$" of the turbine by enhancing the accuracy of the actual machine information in the actual machine information retaining module 107.

In addition, the power generation planning support apparatus in the present embodiment stores the first information on each event time "$t_1$" to "$t_5$" in the predicted time database 104. Therefore, according to the present embodiment, by referring to the predicted time database 104, it is possible to grasp which event time in the predicted time database 104 has a large error in its first information. In addition, according to the present embodiment, it is possible to appropriately adjust the values of the parameters in the above-mentioned expression for each event before new first information is derived by the startup time calculating module 109, enabling the prediction accuracy for each of the event time "$t_1$" to "$t_5$" to be enhanced. In addition, according to the present embodiment, it is possible to limit kinds of parameters to be adjusted by the parameter adjusting module 106 by the parameter selecting module 108 selecting the parameters.

In the present embodiment, if the number of startups of the turbine is small, and the amount of information contained in the first information is small, in some cases first information corresponding to the metal temperature acquired by metal temperature receiving module 101 or the ambient temperature acquired by the ambient temperature receiving module 102 is not stored in the predicted time database 104. However, according to the present embodiment, it is possible even in such a case to predict the event time "$t_1$" to "$t_5$" and the startup time "t" with high accuracy by updating the first information in the predicted time database 104 using the values of the parameters adjusted by the parameter adjusting module 106.

In the power generation planning support apparatus in the present embodiment, the first information in the predicted time database 104 may be updated by a component other than the parameter adjusting module 106, the actual machine information retaining module 107, the parameter selecting module 108, and the startup time calculating module 109.

Figure 5:
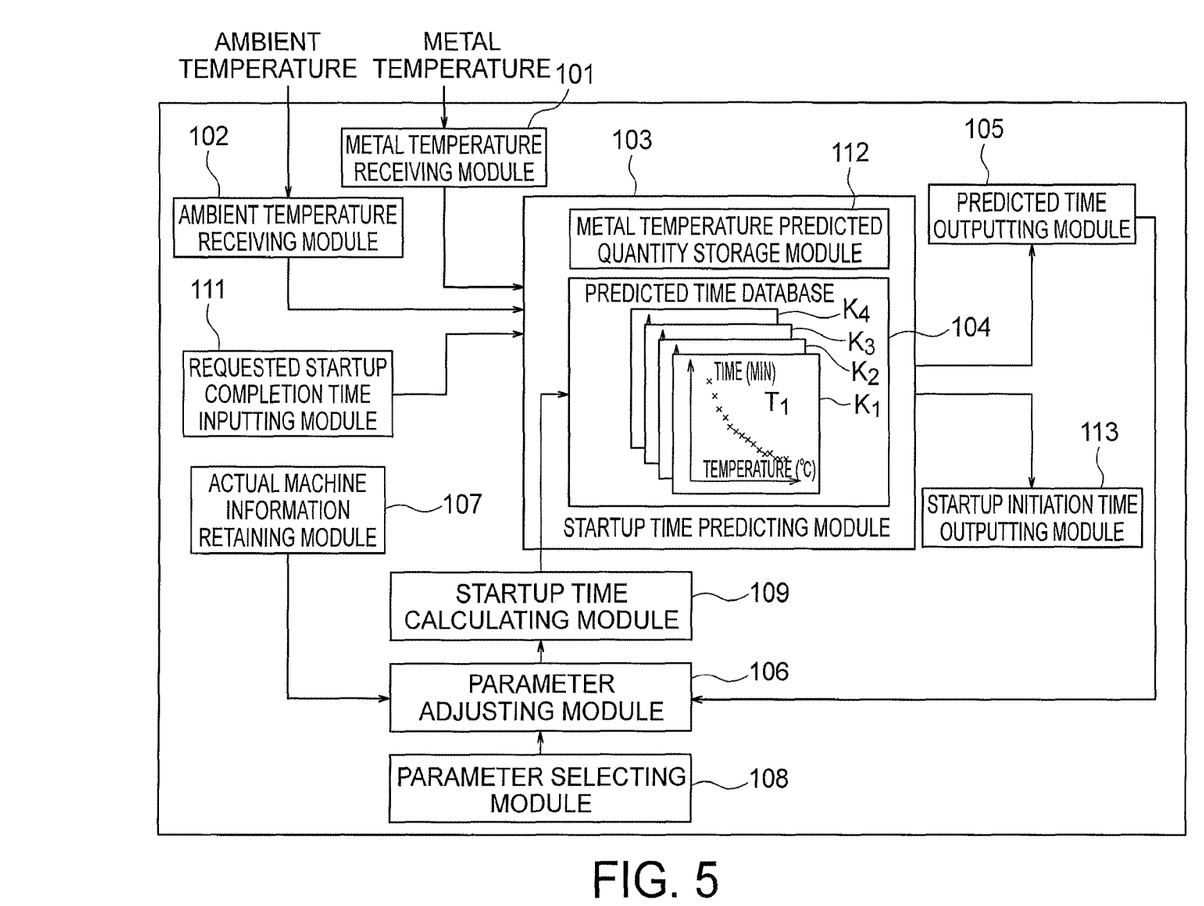
FIG. 5 is a schematic diagram illustrating a configuration of a power generation planning support apparatus in a second embodiment.

Second Embodiment (1) Configuration of Power Generation Planning Support Apparatus in Second Embodiment FIG. 5 is a schematic diagram illustrating a configuration of a power generation planning support apparatus in a second embodiment.

The power generation planning support apparatus illustrated in FIG. 5 includes, in addition to the components illustrated in FIG. 1, a requested startup completion time inputting module 111, a metal temperature predicted quantity storage module 112, and a startup initiation time outputting module 113. The requested startup completion time inputting module 111 is an example of an inputting module. The metal temperature predicted quantity storage module 112 is an example of a second storage module.

The metal temperature receiving module 101 receives the current metal temperature of a turbine rotor coupled to a turbine and inputs the received metal temperature into the startup time predicting module 103. Typically, the metal temperature of the turbine rotor is maintained at high temperatures during a period of several days after the stop of the turbine, gradually decreasing during the period. The metal temperature receiving module 101 in the present embodiment receives the metal temperature during the period. In addition, if the application target of the present embodiment is a combined-cycle power plant provided with a gas turbine, the ambient temperature receiving module 102 receives the current ambient temperature of the turbine and inputs the received ambient temperature into the startup time predicting module 103.

A user of the present embodiment can input the requested time at which the turbine reaches a power generating state (requested startup completion time) into a user interface of the power generation planning support apparatus. The requested startup completion time inputting module 111 accepts the input of the requested startup completion time and inputs the requested startup completion time and the current time into the startup time predicting module 103.

In the metal temperature predicted quantity storage module 112, information is stored that represents a changing process in which the metal temperature varies with time (hereafter, referred to as second information). The second information in the present embodiment represents the relationship between the metal temperature actually measured after the stop of the turbine and time. Therefore, in the present embodiment, using the metal temperature predicted quantity storage module 112 enables the prediction of a metal temperature after the given time from the stop of the turbine. The second information in the present embodiment may contain the information on changing processes of the metal temperature at various ambient temperatures.

The startup time predicting module 103 predicts the startup initiation time of the turbine that satisfies the requested startup completion time, based on the metal temperature acquired by the metal temperature receiving module 101, the requested startup completion time and the current time input by the requested startup completion time inputting module 111, and the second information stored in the metal temperature predicted quantity storage module 112.

For example, when the metal temperature is high, the turbine can be brought into the power generating state in short time. Therefore, the startup initiation time predicted by the startup time predicting module 103 is the time the short time before the requested startup completion time. In contrast, when the metal temperature is low, it takes long time to bring the turbine into the power generating state. Therefore, the startup initiation time predicted by the startup time predicting module 103 is the time the long time before the requested startup completion time.

The startup initiation time predicted by the startup time predicting module 103 is output to the startup initiation time outputting module 113. The startup time predicting module 103 may take the ambient temperature acquired by the ambient temperature receiving module 102 into consideration when predicting the startup initiation time.

The startup initiation time outputting module 113 outputs the startup initiation time acquired by the startup time predicting module 103. The startup initiation time is output in the form of, for example, displaying on a display device of the power generation planning support apparatus, data transmission to the outside of the power generation planning support apparatus, storing in an internal storage of the power generation planning support apparatus, and the like.

(2) Action of Power Generation Planning Support Apparatus in Second Embodiment

Figure 6:
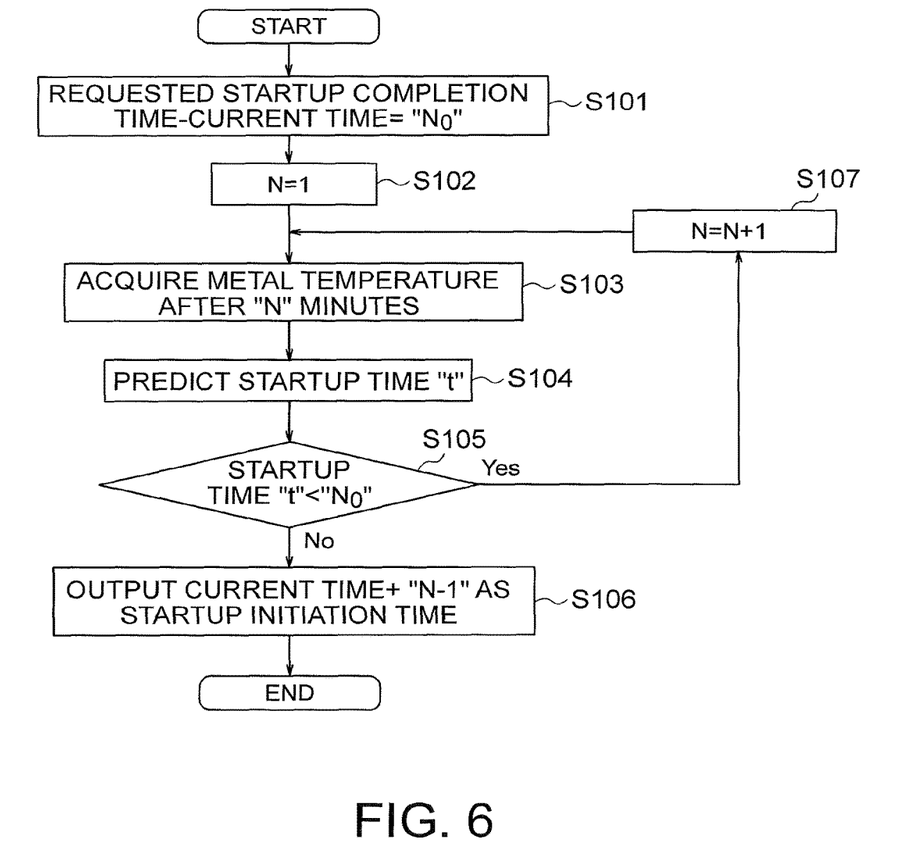
FIG. 6 is a flow chart illustrating a power generation planning support method in the second embodiment.

FIG. 6 is a flow chart illustrating a power generation planning support method in the second embodiment. FIG. 6 illustrates a specific example of processing performed by the startup time predicting module 103.

The startup time predicting module 103 first calculates the time "$N_0$" from the current time until the requested startup completion time (step S101). Reference character "N" illustrated in step S102 denotes the elapsed time from the current time. The elapsed time "N" is in minutes. In step S102, the startup time predicting module 103 sets the elapsed time "N" at 1 minute.

Next, the startup time predicting module 103 refers to the metal temperature predicted quantity storage module 112 to acquire a metal temperature "N" minutes after (1 minute after) from the current time (step S103). Next, the startup time predicting module 103 refers to the predicted time database 104 to predict the startup time "t" corresponding to the metal temperature (step S104). Next, the startup time predicting module 103 compares the startup time "t" with the time "$N_0$" (step S105).

When the startup time "t" is longer than or equal to the time "$N_0$", the startup time predicting module 103 outputs "current time+"N−1"" minutes as the startup initiation time (step S106). Since "N"=1 here, the startup time predicting module 103 outputs the current time as the startup initiation time. This is equivalent to a prediction result that the turbine should be started up immediately.

On the other hand, when the startup time "t" is shorter than the time "$N_0$", starting up the turbine at the current time causes the startup of the turbine to be completed earlier than the requested startup completion time. Therefore, the startup time predicting module 103 increases the elapsed time "N" by 1 minute (step S107) and performs the processes of steps S103 to S105 again. The processes of steps S103 to S105 are repeated likewise until the startup time "t" is longer than or equal to the time "$N_0$". The elapsed time "N" is to be increased to 2 minutes, 3 minutes, 4 minutes, . . . .

(3) Effects of Power Generation Planning Support Apparatus in Second Embodiment

As described above, the power generation planning support apparatus in the present embodiment stores the second information that represents the changing process of the metal temperature, in the metal temperature predicted quantity storage module 112. The startup time predicting module 103 in the present embodiment then predicts the startup initiation time of the turbine that satisfies the requested startup completion time based on the metal temperature acquired by the metal temperature receiving module 101, the requested startup completion time and current time input into the requested startup completion time inputting module 111, and the second information stored in the metal temperature predicted quantity storage module 112.

For this reason, in the present embodiment, a future metal temperature can be predicted based on the current metal temperature by referring to the metal temperature predicted quantity storage module 112. Therefore, according to the present embodiment, it is possible to predict the startup initiation time of the turbine even when the turbine rotor is at a high temperature after the stop of the turbine. The prediction result is effective in the case where, for example, the turbine is restarted after the turbine is stopped for a short period.

The prediction of the future metal temperature may be performed in a startup process with a typical mismatch chart. However, in the startup process with the typical mismatch chart, a startup mode is defined as cold, warm, or hot, and the predicted startup time are limited to three types, allowing the startup initiation time to be calculated without complex calculation. However, in the startup process by the optimal startup, the metal temperature and the ambient temperature take on various values, and the predicted startup time changes to various values. According to the present embodiment, it is possible to easily calculate the startup initiation time even in the application of such an optimal startup.

Figure 7:
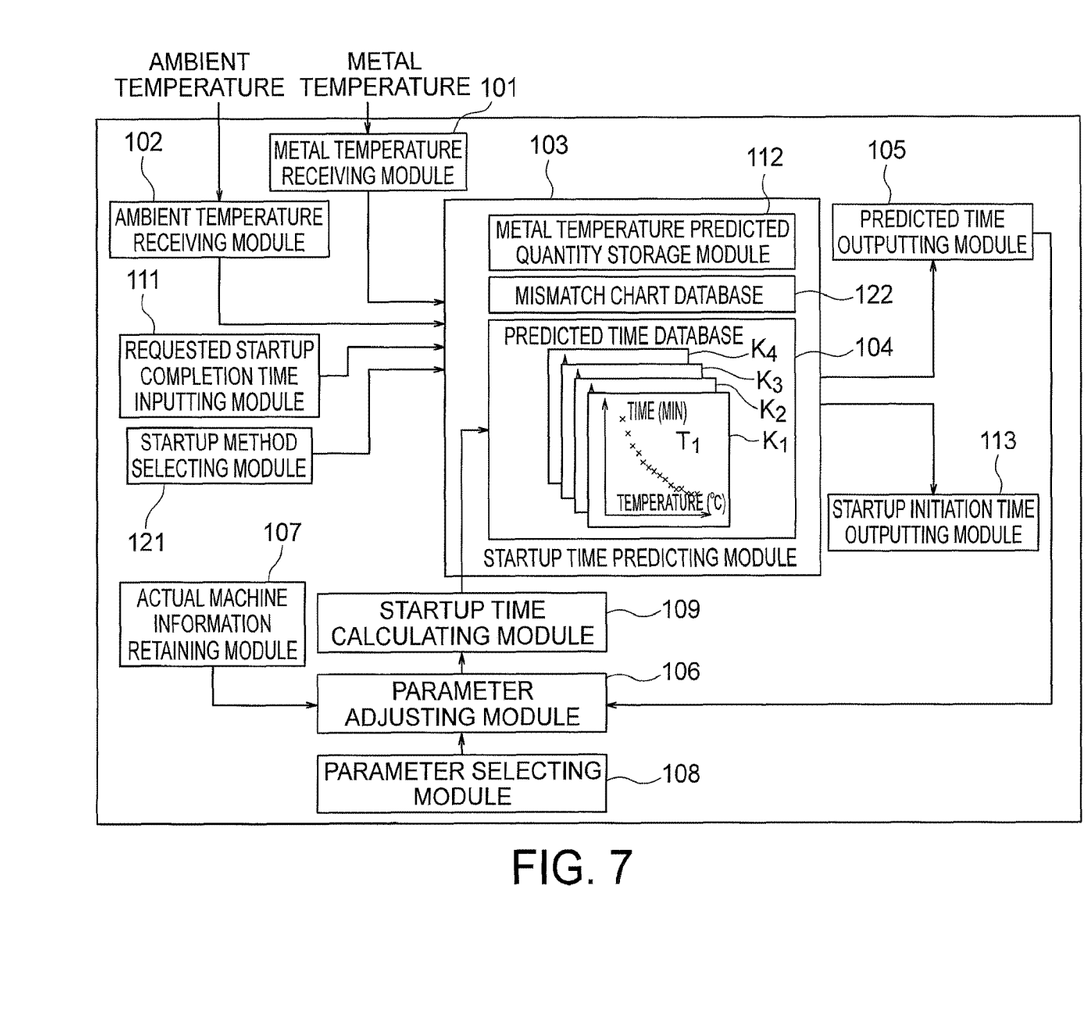
FIG. 7 is a schematic diagram illustrating a configuration of a power generation planning support apparatus in a third embodiment.

Third Embodiment (1) Configuration of Power Generation Planning Support Apparatus in Third Embodiment FIG. 7 is a schematic diagram illustrating a configuration of a power generation planning support apparatus in a third embodiment.

The power generation planning support apparatus illustrated in FIG. 7 includes, in addition to the components illustrated in FIG. 5, a startup method selecting module 121, and a mismatch chart database 122. The startup method selecting module 121 is an example of a selecting module. The mismatch chart database 122 is an example of a third storage module.

In the mismatch chart database 122, as with the predicted time database 104, information is stored that represents the relationship between the metal temperature of a turbine and an ambient temperature, and a startup schedule of the turbine (hereafter, referred to as third information). However, in the predicted time database 104, the event time "$t_1$" to "$t_5$" and the startup time "t" of the time when the turbine is started up by the optimal startup are stored, whereas in mismatch chart database 122, the event time "$t_1$" to "$t_5$" and the startup time "t" of the time when the turbine is started up using a mismatch chart are stored. In the mismatch chart, the event time "$t_1$" to "$t_5$" and the startup time "t" are set at certain values in accordance with the metal temperature and the ambient temperature.

A user of the present embodiment can select, using a user interface of the power generation planning support apparatus, whether the prediction of the event time "$t_1$" to "$t_5$" and the startup time "t" of the turbine is to be made based on the first information or the third information. For example, an "optimal startup button" and a "mismatch chart button" may be displayed on a display of the power generation planning support apparatus. In this case, when the user presses the optimal startup button, a startup method by the optimal startup using the first information is selected. On the other hand, when the user presses the mismatch chart button, a startup method with a mismatch chart using the third information is selected. Such a user interface is provided by the startup method selecting module 121. The startup method selecting module 121 accepts selecting operation by the user and notifies the startup time predicting module 103 of the startup method selected by the user.

When receiving the notification indicating that the optimal startup is selected, the startup time predicting module 103 predicts the event time "$t_1$" to "$t_5$" and the startup time "t" based on the metal temperature acquired by the metal temperature receiving module 101, the ambient temperature acquired by the ambient temperature receiving module 102, and the first information stored in the predicted time database 104. The predicted event time "$t_1$" to "$t_5$" and the startup time "t" are output to the predicted time outputting module 105. In addition, the startup time predicting module 103 may predict the startup initiation time using the startup time "t" and output the startup initiation time to the startup initiation time outputting module 113.

On the other hand, when receiving the notification indicating that the mismatch chart is selected, the startup time predicting module 103 predicts the event time "$t_1$" to "$t_5$" and the startup time "t" based on the metal temperature acquired by the metal temperature receiving module 101, the ambient temperature acquired by the ambient temperature receiving module 102, and the third information stored in the mismatch chart database 122. The predicted event time "$t_1$" to "$t_5$" and the startup time "t" are output to the predicted time outputting module 105. In addition, the startup time predicting module 103 may predict the startup initiation time using the startup time "t" and output the startup initiation time to the startup initiation time outputting module 113.

(2) Effect of Power Generation Planning Support Apparatus in Third Embodiment

As described above, the power generation planning support apparatus in the present embodiment predicts a startup schedule such as the event time "$t_1$" to "$t_5$" and the startup time "t" based on information selected by a user from between the first information and the third information.

Therefore, according to the present embodiment, it is possible to predict not only a startup schedule in the application of the optimal startup, but also a startup schedule in the application of a mismatch chart. A startup schedule predicted using a mismatch chart is used in the case where, for example, an operating party of a power plant selects a startup using a mismatch chart after the maintenance of a turbine or in the occurrence of abnormality in the turbine.

While certain embodiments have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from the spirit of the inventions. The accompanying claims and their equivalents are intended to cover such forms or modifications as would fall within the scope and spirit of the inventions.

The invention claimed is:

1. A power generation planning support and control method, comprising:
    acquiring, by circuitry, a physical quantity that represents a startup condition of a turbine;
    reading, using the circuitry, first information that represents a relationship between a startup schedule of the turbine and the physical quantity;
    predicting, by the circuitry, the startup schedule that corresponds to the acquired physical quantity, by extracting the startup schedule, based on the acquired physical quantity and the read first information;
    outputting, using the circuitry, the predicted startup schedule;
    calculating, by the circuitry, a startup schedule based on a plurality of previously stored parameters, each of the plurality of previously stored parameters corresponding to a different one of a plurality of times of events during a startup of the turbine, with a plurality of parameters that are adjusted by adjusting the plurality of previously stored parameters separately and in a predetermined order based on an order of the plurality of times when an error between the output startup schedule and an actual machine startup schedule is larger than a threshold, and updating the plurality of previously stored parameters to the adjusted parameters and updating the stored startup schedule to the calculated startup schedule to enhance an accuracy of the predicted startup schedule when an error between the calculated startup schedule and the actual machine startup schedule is smaller than the threshold; and initiating startup of the turbine in accordance with the output startup schedule.

2. The method of claim 1, comprising acquiring, as the physical quantity, a temperature of a predetermined portion of the turbine.

3. The method of claim 1, comprising acquiring, as the physical quantity, an ambient temperature of the turbine.

4. The method of claim 1, comprising predicting, as the startup schedule, startup time that is taken for the startup of the turbine.

5. The method of claim 1, comprising predicting, as the startup schedule, event time that is taken for an event during the startup of the turbine.

6. The method of claim 1, comprising deriving the calculated startup schedule by predicting a thermal stress occurring in a predetermined portion of the turbine during the startup of the turbine and predicting a changing process of a number of revolutions and a load of the turbine that makes shortest startup time taken for the startup of the turbine while keeping the thermal stress to a specified value or lower.

7. The method of claim 1, further comprising:

receiving, using the circuitry, requested time at which the turbine reaches a power generating state;

storing, using the circuitry, second information that represents a changing process of the physical quantity; and predicting, using the circuitry, startup initiation time of the turbine that satisfies the requested time, based on the received requested time, the acquired physical quantity, and the stored second information.

8. The method of claim 1, further comprising:

storing, using the circuitry, third information that represents a relationship between the startup schedule and the physical quantity and is different from the first information;

selecting, using the circuitry, whether the startup schedule is to be predicted based on the first information or the third information; and predicting, using the circuitry, the startup schedule of the turbine based on a selected one of the first information and the third information.

9. The method of claim 1, wherein the startup schedule includes event time that is taken for an event during the startup of the turbine, and the actual machine startup schedule includes actual machine event time that is the event time acquired when the turbine is actually started up.

10. The method of claim 1, comprising repeating the adjustment of the values of the parameters until a difference between the startup schedule calculated by using the values of the parameters and the actual machine startup schedule becomes a predetermined difference or smaller.

* * * * *